United States Patent [19]

Cullen

[11] Patent Number: 5,295,554
[45] Date of Patent: Mar. 22, 1994

[54] STEERING SYSTEM FOR AN AGRICULTURAL BAGGING MACHINE

[76] Inventor: Steven R. Cullen, P.O. Box 642, Astoria, Oreg. 97103

[21] Appl. No.: 815,702

[22] Filed: Dec. 31, 1991

[51] Int. Cl.⁵ .............................................. B62D 9/00
[52] U.S. Cl. ..................................... 180/236; 180/140
[58] Field of Search ....................... 180/252, 236, 140; 280/91

[56] References Cited

U.S. PATENT DOCUMENTS

| | | | |
|---|---|---|---|
| 3,255,840 | 6/1966 | Tangen | 180/236 |
| 3,687,061 | 8/1972 | Eggenmuller et al. | 100/65 |
| 4,046,068 | 9/1977 | Eggenmuller et al. | 100/65 |
| 4,337,805 | 7/1982 | Johnson et al. | 141/71 |
| 4,373,603 | 2/1983 | Nelson | 180/236 |
| 4,621,666 | 11/1986 | Ryan | 141/114 |
| 4,823,899 | 4/1989 | Ron | 180/140 |

FOREIGN PATENT DOCUMENTS 652362  11/1985  Switzerland .................. 180/23 V Primary Examiner—Mitchell J. Hill
Attorney, Agent, or Firm—Zarley, McKee, Thomte, Voorhees & Sease

[57] ABSTRACT

An agricultural bagging machine including a wheeled frame having at least first and second wheels provided at the forward end thereof and at least third and fourth wheels provided at the rearward end thereof. First, second, third and fourth hydraulic cylinders are pivotally connected to the first, second, third and fourth wheels respectively with the first and second wheels being operated together and independent of the third and fourth wheels. The third and fourth wheels operate together and operate independently of the first and second wheels. A vertically disposed hydraulic jack stand is mounted on the machine at the tow end thereof to enable the second and fourth wheels as well as the tow end of the machine to be raised so that the second and fourth wheels are out of ground engagement. The povital arrangement of the wheels permits the machine to be spin-turned and maneuvered.

12 Claims, 4 Drawing Sheets

STEERING SYSTEM FOR AN AGRICULTURAL BAGGING MACHINE

BACKGROUND OF THE INVENTION

This invention relates to an agricultural bagging machine and more particularly to a steering system for such a machine.

Agricultural bagging machines have been used for some time to fill large elongated agricultural bags with silage or the like. For example, see U.S. Pat. Nos. 3,687,061, 4,046,068, 4,337,805 and 4,621,666.

The smaller two-wheel bagging machines are normally hitched to a tractor with the bagging machine pushing the tractor along the ground as the bag as being filled. The two-wheel machines normally have a width sufficiently small enough so that the machine may be towed from one location to another without pivoting the supporting wheels from a bagging position to a towing position. However, in the large four-wheel machines, the width of the machines is such that they are too wide to be pulled from one location to another in the bagging position. Thus, it was heretofore necessary for the machine to be raised by means of a jack or the like so that the wheels could be moved from their normal bagging position to a transport or tow position. This process normally required that pins or bolts be removed and replaced when the wheels had been pivoted.

A further disadvantage in the prior art four-wheel machines is that it was sometimes difficult, if not impossible, to form straight bags since the wheels of the bagging machine did not have any steering capability with the straightness or alignment of the bag being dependent solely upon the brakes at the opposite side of the machine. Yet another disadvantage of the prior art machines of the type described hereinabove is that they are difficult to maneuver in close quarters. A further disadvantage of the prior art machines is that the design of the same made it difficult to closely position adjacent bags.

It is therefore a principal object of the invention to provide an improved bagging machine.

A further object of the invention is to provide a bagging machine wherein the supporting wheels may be quickly and easily pivoted from a bagging position to a tow position by means of hydraulic cylinders operatively connected thereto.

Yet another object of the invention is to provide a bagging machine having steering capabilities.

Still another object of the invention is to provide a bagging machine having the capability of "spin turning".

Yet another object of the invention is to provide a bagging machine having support wheels pivotally mounted thereon which includes a pair of driven wheels.

Yet another object of the invention is to provide a bagging machine which eliminates the necessity of wheel stops, pins or bolts to maintain the wheels in the proper bagging or tow position.

Yet another object of the invention is to provide a bagging machine having hydraulically pivoted wheels including re-phase cylinders to ensure that the wheels will be properly aligned.

Still another object of the invention is to provide a bagging machine which may be operated in tight quarters.

These and other objects of the invention will be apparent to those skilled in the art.

SUMMARY OF THE INVENTION

An agricultural bagging machine is described including a wheeled frame means having at least a first and second wheel provided at the forward end thereof and at least a third and fourth wheel provided at the rearward or discharge end thereof. The bagging machine includes a conventional structure such as a tunnel for filling an expandable flexible agricultural bag and a rotor for forcing the silage or the like through the tunnel into the bag. First, second, third and fourth hydraulic cylinders are pivotally connected to the first, second, third and fourth wheels respectively, the first and second wheels being operated together and independent of the third and fourth wheels. The third and fourth wheels operate together and operate independently of the first and second wheels. The first and second hydraulic cylinders are fluidly interconnected and include re-phase cylinders. (The third and fourth hydraulic cylinders are fluidly interconnected and include re-phase cylinders). As the first hydraulic cylinder extends to pivot the first wheel, the second hydraulic cylinder retracts to pivot the second wheel and vice versa. As the third hydraulic cylinder extends to pivot the third wheel, the fourth hydraulic cylinder retracts to pivot the fourth wheel. A vertically disposed hydraulic jack stand is provided at the tow end of the bagging machine to enable the second and fourth wheels as well as the tow end of the machine to be raised so that the second and fourth wheels are out of ground engagement. The first and second wheels are driven wheels, with the first wheel being operable to spin turn the bagging machine around the jack stand when the second and fourth wheels have been raised from the ground. During the bagging operation, the first and second wheels may be steered to ensure that a perfectly straight filled bag will result. The hydraulic cylinders for each of the wheels are located inside of the wheel frames so that the machine may fill bags in a close position to one another.

DESCRIPTION OF THE PREFERRED EMBODIMENT

Figure 1:
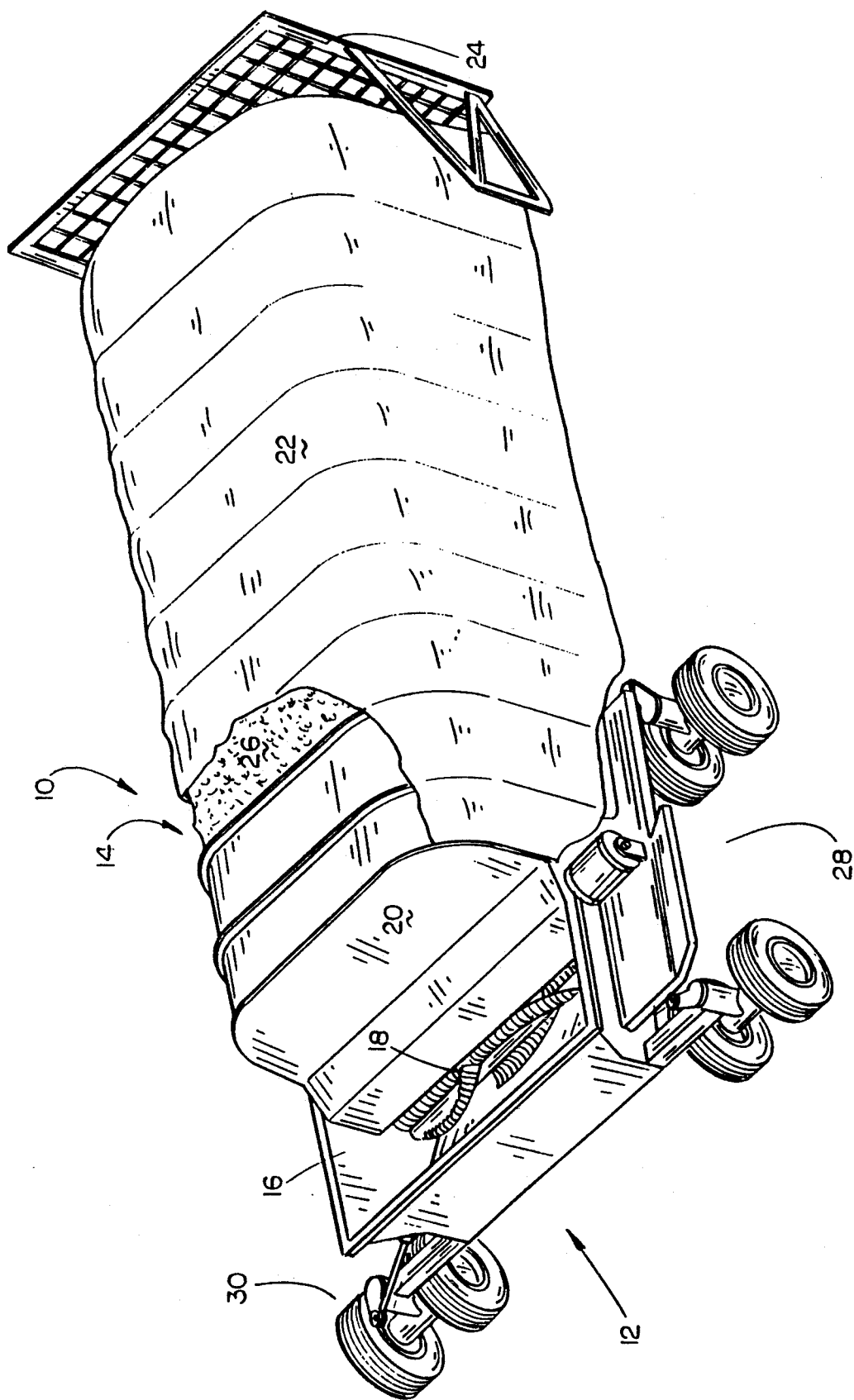
FIG. 1 is a side elevational view of an agricultural bagging machine.

The bagging machine of this invention is referred to generally at 10 and includes a feed end 12 and a discharge end 14. Bagging machine 10 includes a hopper 16, rotor 18, and tunnel 20. The numeral 22 refers to a conventional expandable agricultural bag which is normally positioned on the exterior of the tunnel 20 in a folded condition but which is unfolded against a backstop 24 as the silage 26 is forced through the tunnel 20 by the rotor 18 and into the bag 22.

For purposes of description, the numeral 28 refers to the drive side of the bagging machine 10 while the numeral 30 refers to the tow end of the bagging machine.

Figure 2:
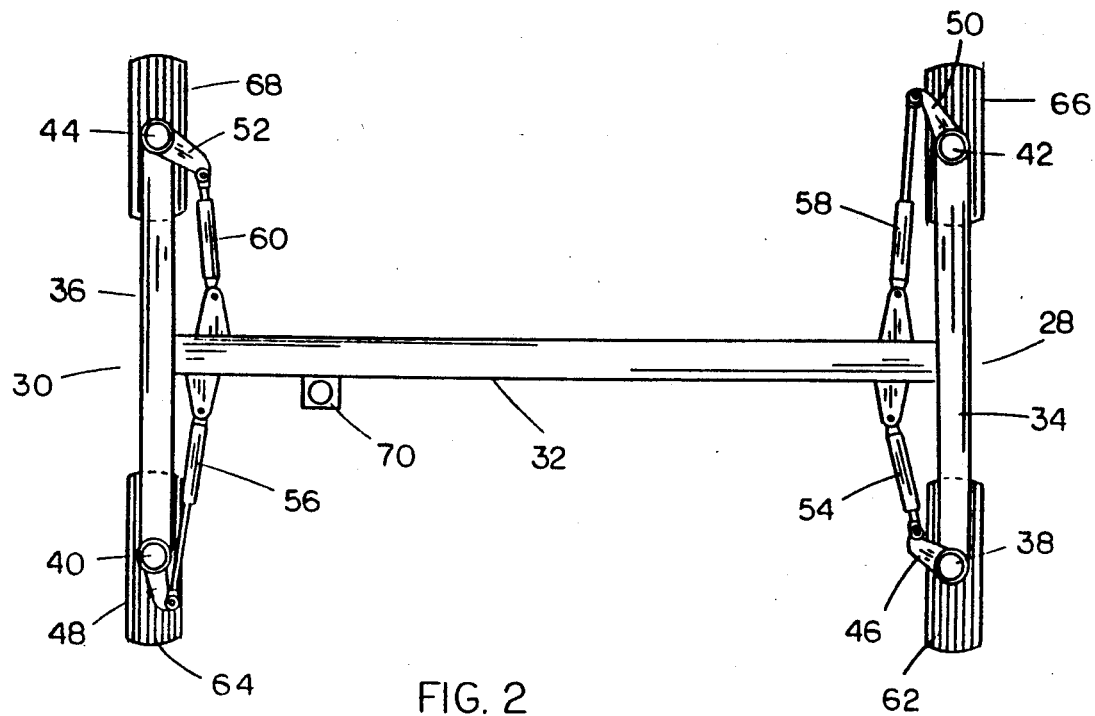
FIG. 2 is a top view of the steering system.
Figure 3:
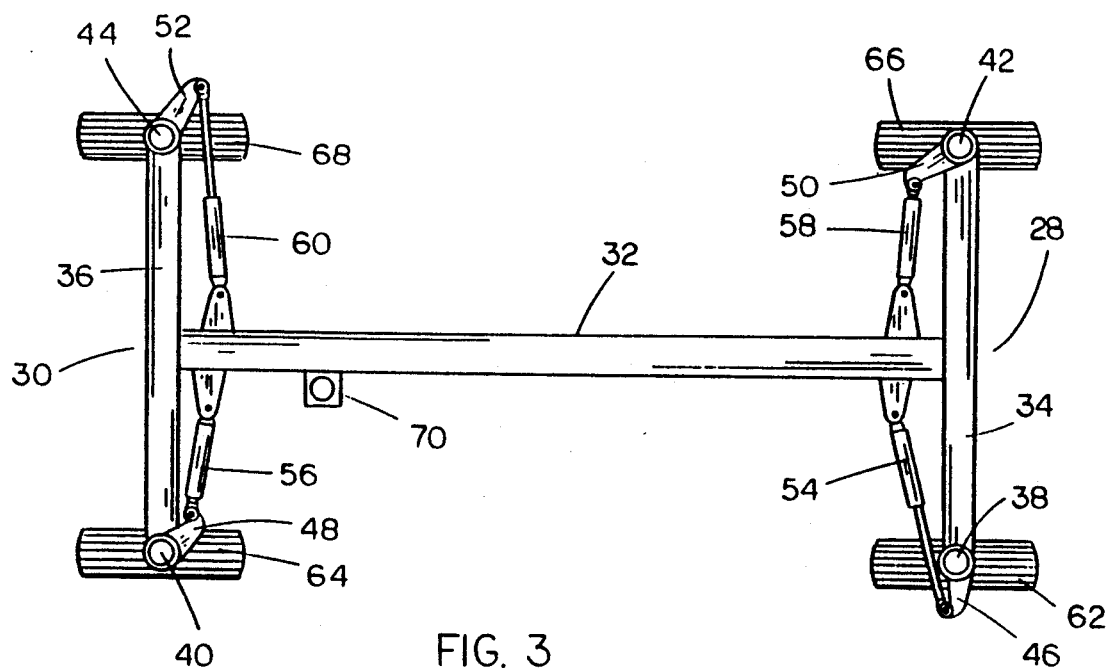
FIG. 3 is a similar view to FIG. 2 except the wheels are turned at right angles to the end frames.

Bagging machine 10 includes a main frame member 32 which is disposed transversely to the machine when the machine is moving in its bagging mode. A pair of end frames 34 and 36 are secured to the opposite ends of the main frame member 32 as seen in FIGS. 2 and 3. Spindle assembly 38 is mounted on the forward end of end frame 34 while spindle assembly 40 is mounted on the forward end of frame 36. Spindle assembly 42 is mounted on the rearward end of end frame 34 while Hyspindle assembly 44 is mounted on the rear end of end frame 36. Steering links 46, 48, 50 and 52 are operatively secured to the spindle assemblies 38, 40, 42 and 44 respectively and have hydraulic cylinders 54, 56, 58 and 60 operatively connected thereto for pivoting the respective spindle assembly. It should be noted that FIG. 1 illustrates that a pair of wheels is operatively connected to each spindle assembly while the remaining drawings indicate that a single wheel is connected to each spindle assembly. It is preferred that only a single wheel be connected to each of the spindle assemblies as illustrated in FIG. 2-5 although a pair of wheels may be connected to each of the spindle assemblies as illustrated if FIG. 1 if so desired.

Figure 6:
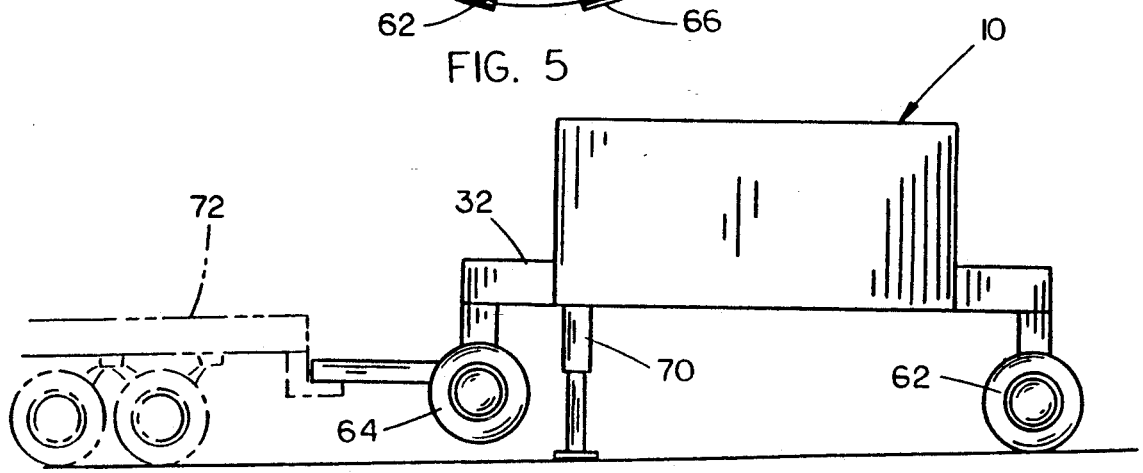
FIG. 6 is a side view illustrating how the hydraulic jack stand raises the agricultural bagging machine to enable the bagging machine to be moved from one location to another.

The numerals 62, 64, 66 and 68 refer to wheels secured to, the lower ends of the spindle assemblies 38, 40, 42 and 44 respectively. The radius of steering links 46 and 48 are shorter than the radius of steering links of 50 and 52 due to the need for more turning degrees (120) for the wheels 62 and 64. A hydraulically operated jack stand 70 is provided on main frame member 32 adjacent end frame 36 and is designed to be lowered into ground engagement so that wheels 64 and 68 may be raised upwardly out of ground engagement to enable the bagging machine to be spin-turned as will be described in more detail hereinafter. Further, the hydraulic jack stand 70 permits the tow end 30 of the machine 10 to be raised so that the hitch 70 may be connected to a prime mover 72 to enable the bagging machine to be moved from one location to another as seen in FIG. 6.

Figure 7:
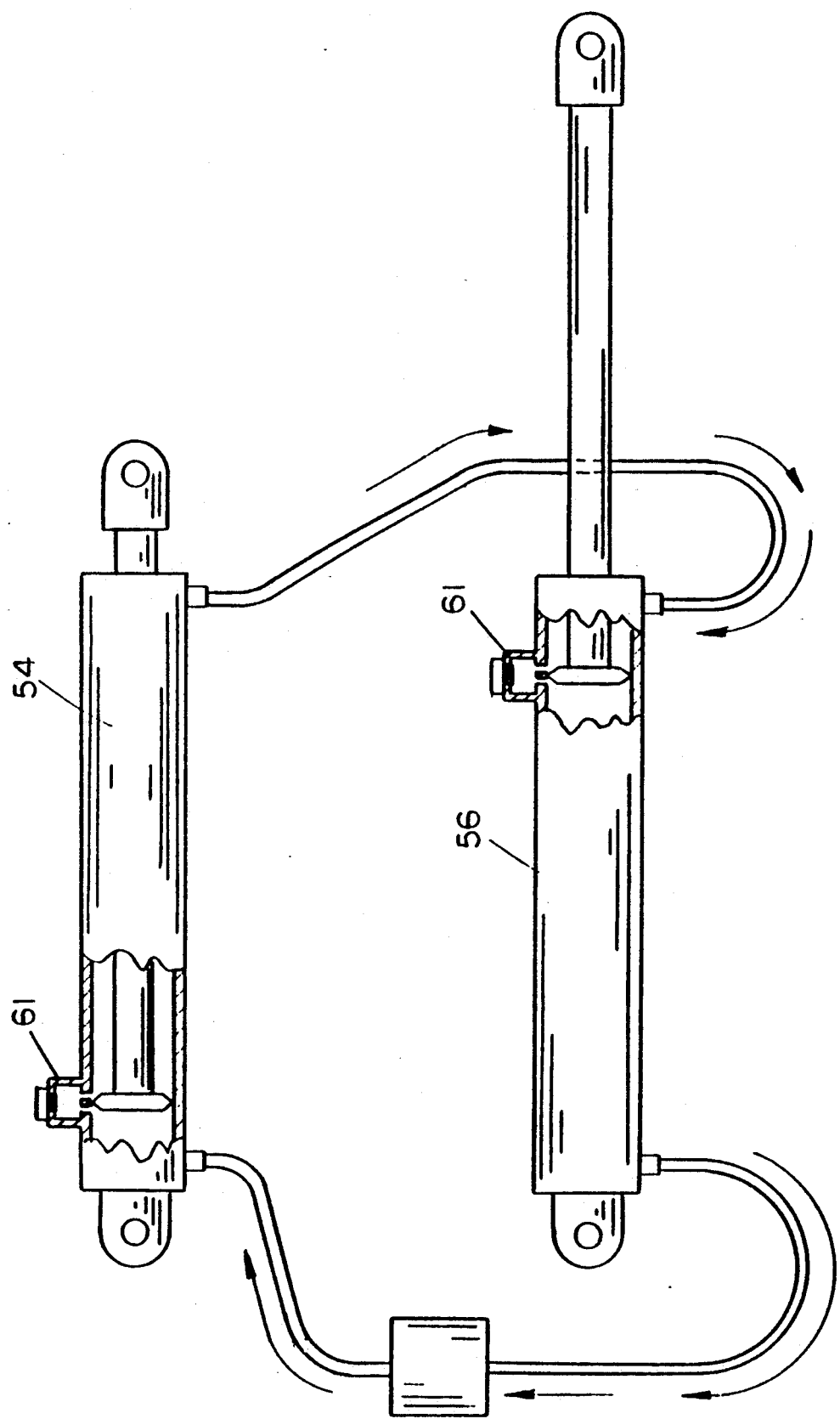
FIG. 7 shows how the hydraulic cylinders are fluidly interconnected so that one hydraulic cylinder will be extended as one hydraulic cylinder retracts and vice versa.

Hydraulic cylinders 54 and 56 are fluidly interconnected so that hydraulic cylinder 54 will be extended as hydraulic cylinder 56 retracts and vice versa. Hydraulic cylinders 58 and 60 are fluidly interconnected so that hydraulic cylinder 58 will extend while hydraulic cylinder 60 retracts and vice versa. Each of the hydraulic cylinders has the exact same internal dimensions and are fitted with re-phase assemblies 61 so that the cylinders 54 and 56 always remain synchronized and so that hydraulic cylinders 58 and 60 remain synchronized. The re-phase ports for hydraulic cylinders 54 and 60 are located at the base ends of the cylinders while the re-phase ports for hydraulic cylinders 58 and 56 are located adjacent the rod end of the hydraulic cylinder. Thus, the re-phase ports are on opposite ends of connected cylinders so that the cylinders may be synchronized with one extended and one retracted as seen in FIG. 7. When the cylinders are positioned so that the piston thereof is at the re-phase port end of the cylinder, the re-phase port allows oil to pass through the port associated therewith. This operation synchronizes the connected cylinders that may become misaligned due to internal leakage caused by wear during operation over a period of time. FIG. 7 illustrates the typical plumbing between the connected cylinders so that the oil may flow in either direction in each of the lines.

Figure 4:
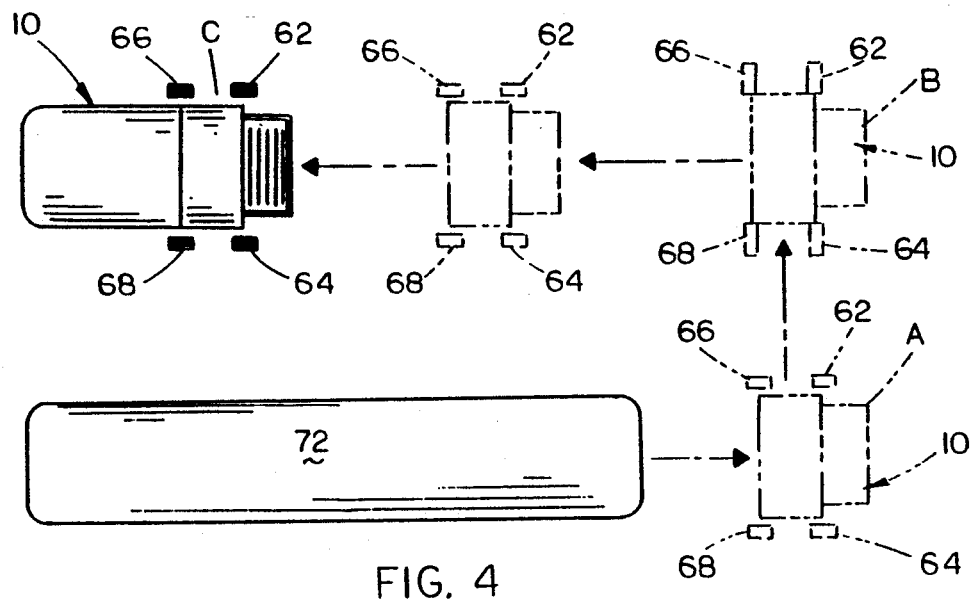
FIG. 4 is an elevational view illustrating how the steering system allows an agricultural bagging machine to perform a difficult maneuver.
Figure 5:
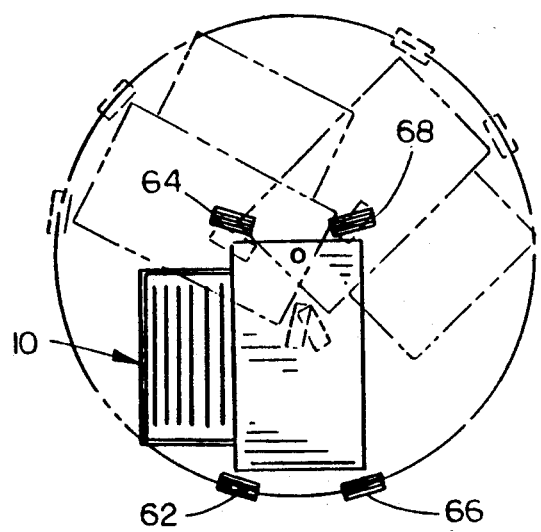
FIG. 5 is an elevational view illustrating how the steering system allows an agricultural bagging machine to turn circularly while staying in one place.

The wheels 62 and 64 are hydraulically driven by suitable means to enable the bagging machine to be maneuvered as illustrated in FIG. 4. Further, wheel 62 may be hydraulic driven to spin turn the machine as will now be described. When it is desired to maneuver the bagging machine by spin-turning the same, jack stand 70 is lowered into ground engagement so that the wheels 64 and 68 are raised out of ground engagement. The operator then actuates hydraulic cylinder 54 (and hydraulic cylinder 56 since it is connected to hydraulic cylinder 54) so that the wheel 62 is positioned perpendicular to the jack stand as illustrated in FIG. 5. Hydraulic cylinder 58 is also actuated so that wheel 66 is pivoted to the position of FIG. 5. Wheel 68 will also be pivoted due to the connection of the hydraulic cylinders 58 and 60 but the wheel 68 is out of ground engagement so that it does not detract from the operation of the spin-turning maneuver. Wheel 62 is then driven by the hydraulic motor operatively connected thereto in either direction so that the machine 10 may pivot around the jack stand 70 as illustrated in FIG. 5. When the machine has been moved to the desired location through the spin-turning maneuver, jack stand 70 is raised so that the wheels 64 and 68 will again move into ground engagement. If the machine is going to be used in a bagging condition, the wheels 62, 64, 66 and 68 will be positioned as illustrated in FIG. 2. If the machine is to be towed, the wheels 62, 64, 66 and 68 will be positioned as illustrated in FIG. 3. The hydraulic motors for the wheels 62 and 64 would normally be fluidly interconnected. Thus, actuation of the hydraulic motor for driving wheel 62 would also cause actuation of the motor connected to wheel 64. On the spin-turn mode, wheel 64 would rotate without any rotation of wheel 62. Thus, it is necessary to provide a valve between the motor for wheels 62 and 64 to provide a posi-traction action there between to prevent the rotation of wheel 64 when wheel 62 is being driven in the spin-turn mode.

FIG. 4 illustrates a maneuver which is made possible by the steering mechanism of the bagging machine. In FIG. 4, the numeral 72 refers to a filled bag. When the machine 10 has filled the bag 72 and it is desired to fill another bag along beside bag 72, the machine 10 is drive forwardly to the position illustrated at A in FIG. 4. The wheels 62, 64, 66 and 68 are pivoted from the bagging position of FIG. 4 to the tow position and the wheels 62 and 64 are driven to move the bagging machine from the position of FIG. A to the position of FIG. B. When position B has been reached, the wheels are moved to their bagging position and the wheels 62 and 64 are operated to move the bagging machine from the position of FIG. B to the position of FIG. C wherein the bagging operation may again commence.

The pivoting of wheels 62 and 64 permits the machine 10 to be steered during the bagging operation as required to ensure that a straight filled bag will result. The wheels are quickly and easily moved from their bagging position to their tow positions by simply actuating the hydraulic cylinders associated therewith from one position to another. For example, when hydraulic cylinder 54 is fully extended to position wheel 62 in the tow position, hydraulic cylinder 56 will be completely retracted to position wheel 64 in the tow position. Similarly, when hydraulic cylinder 58 is fully extended to position wheel 66 in the tow position, hydraulic cylinder 60 will be completely retracted to position wheel 68 in the tow position. The converse is true when the wheels are pivoted from their tow position to their bagging position thereby eliminating any need for wheel stops, pins or bolts to properly position the wheels.

Thus it can be seen that the invention accomplishes at least all of its stated objectives.

I claim:

1. An agricultural bag loading apparatus for loading agricultural feed stock into an agricultural bag comprising,
    a wheeled frame means,
    means on said frame means for receiving feed stock and for forcing the feed stock into an agricultural bag,
    said wheeled frame means including at least a first front wheel and a second front wheel pivotally mounted, about a vertical axis, between bagging and towing positions, and at least a third back wheel and fourth back wheel pivotally mounted thereon, about a vertical axis, between bagging and towing positions,
    and a first, second, third and fourth hydraulic cylinder operatively connected to said first and second front wheel and said third and fourth back wheels respectively, for pivotally moving the wheels between their towing and bagging positions.

2. The apparatus of claim 1 wherein a first, second, third and fourth steering link is operatively connected to said first and second front wheels and said third and fourth wheels respectively and wherein said first, second, third and fourth hydraulic cylinders are operatively connected to said first, second, third and fourth steering links respectively.

3. The apparatus of claim 2 wherein said first and fourth hydraulic cylinders are in their full, extended positions when said wheels are in their said towing position and wherein said second and third hydraulic cylinders are in their fully retracted positions when said wheels are in their said towing position.

4. The apparatus of claim 3 wherein said first and fourth hydraulic cylinders are in their fully retracted positions when said wheels are in their bagging positions and wherein said second and third hydraulic cylinders are in their full, extended positions when said wheels are in their said bagging positions.

5. The apparatus of claim 3 wherein said first and second hydraulic cylinders are operatively fluidly interconnected so that said second hydraulic cylinder will retract as said first hydraulic cylinder extends and vice versa.

6. The apparatus of claim 5 wherein said first and second wheels are steering wheels, when in their said bagging positions, to permit said wheeled frame means to be steered while bagging.

7. The apparatus of claim 3 wherein said third and fourth hydraulic cylinders are fluidly interconnected so that said fourth hydraulic cylinder will retract as said third hydraulic cylinder extends and vice versa.

8. The apparatus of claim 3 wherein said first and second hydraulic cylinders operate independently of said third and fourth hydraulic cylinders.

9. The apparatus of claim 8 wherein said first and second wheels are driven wheels.

10. The apparatus of claim 9 wherein a vertically moveable jack stand is provided on said frame means adjacent said second and fourth wheels for lowering into ground engagement to raise said second and fourth wheels out of ground engagement.

11. The apparatus of claim 7 wherein said first, second, third and fourth hydraulic cylinders are equipped with re-phase cylinders.

12. The apparatus of claim 11 wherein the re-phase cylinders of fluidly connected hydraulic cylinders are located adjacent opposite ends of the respective cylinders.

* * * * *